(12) United States Patent
Lv

(10) Patent No.: US 10,185,433 B2
(45) Date of Patent: Jan. 22, 2019

(54) METHOD AND APPARATUS FOR TOUCH RESPONDING OF WEARABLE DEVICE AS WELL AS WEARABLE DEVICE

(71) Applicant: BOE TECHNOLOGY GROUP CO., LTD., Beijing (CN)

(72) Inventor: Xuewen Lv, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/325,057

(22) PCT Filed: Feb. 14, 2016

(86) PCT No.: PCT/CN2016/073771
§ 371 (c)(1),
(2) Date: Jan. 9, 2017

(87) PCT Pub. No.: WO2017/041433
PCT Pub. Date: Mar. 16, 2017

(65) Prior Publication Data
US 2017/0205939 A1     Jul. 20, 2017

(30) Foreign Application Priority Data
Sep. 10, 2015 (CN) .......................... 2015 1 0575198

(51) Int. Cl.
*G06F 3/033* (2013.01)
*G06F 3/041* (2006.01)
(Continued)

(52) U.S. Cl.
CPC ........... *G06F 3/0416* (2013.01); *G04G 21/08* (2013.01); *G06F 1/163* (2013.01); *G06F 3/017* (2013.01);
(Continued)

(58) Field of Classification Search
USPC ................ 345/156, 158, 168, 173; 348/169; 713/168
See application file for complete search history.

(56) References Cited

U.S. PATENT DOCUMENTS 7,148,913 B2 * 12/2006 Keaton ................... G06F 3/011
348/169
10,026,177 B2 * 7/2018 Wilson ............... G06K 9/00355
345/158

(Continued)

FOREIGN PATENT DOCUMENTS

| CN | 102662462 | 9/2012 |
| CN | 103150020 | 6/2013 |

(Continued)

OTHER PUBLICATIONS

International Search Report and Written Opinion in PCT/CN2016/073771 dated Jun. 14, 2016, with English translation. 15 pages.
(Continued)

*Primary Examiner* — Thuy Pardo
(74) *Attorney, Agent, or Firm* — Womble Bond Dickinson (US) LLP

(57) ABSTRACT

The present disclosure relates to a method and apparatus for touch responding of a wearable device, and the wearable device. The method for touch responding of the wearable device comprises: acquiring position information of a target fingertip collected by binocular recognition means in a set touch action occurrence area; determining a mapping point mapped on a screen of the wearable device for the target fingertip based on the position information of the target fingertip; and displaying a cursor at the mapping point on the screen of the wearable device. The wearable device according to the present disclosure feeds back effect of touch (Continued)

operations to the user in real time, and thus improves touch accuracy of the wearable device.

17 Claims, 4 Drawing Sheets

(51) Int. Cl.
| | |
|---|---|
| *G06F 3/0484* | (2013.01) |
| *G04G 21/08* | (2010.01) |
| *G06F 3/0346* | (2013.01) |
| *G06F 3/042* | (2006.01) |
| *G06F 3/0488* | (2013.01) |
| *G06F 1/16* | (2006.01) |
| *G06F 3/01* | (2006.01) |
| *G06F 3/03* | (2006.01) |
| *G06F 3/038* | (2013.01) |
| *G06F 3/0481* | (2013.01) |

(52) U.S. Cl.
CPC ............ *G06F 3/0304* (2013.01); *G06F 3/038* (2013.01); *G06F 3/0346* (2013.01); *G06F 3/042* (2013.01); *G06F 3/0425* (2013.01); *G06F 3/0484* (2013.01); *G06F 3/04812* (2013.01); *G06F 3/04883* (2013.01); *G06F 2200/1637* (2013.01); *G06F 2203/04108* (2013.01)

(56) References Cited

U.S. PATENT DOCUMENTS

| | | | | |
|---|---|---|---|---|
| 2002/0036617 | A1* | 3/2002 | Pryor | G06F 3/042 |
| | | | | 345/156 |
| 2006/0033713 | A1* | 2/2006 | Pryor | G06F 3/042 |
| | | | | 345/158 |
| 2013/0169527 | A1* | 7/2013 | Pryor | G06F 3/042 |
| | | | | 345/156 |
| 2013/0249791 | A1* | 9/2013 | Pryor | G06F 3/042 |
| | | | | 345/156 |
| 2014/0085259 | A1 | 3/2014 | Lee | |
| 2014/0184496 | A1* | 7/2014 | Gribetz | G02B 27/017 |
| | | | | 345/156 |
| 2014/0337621 | A1* | 11/2014 | Nakhimov | G06F 1/163 |
| | | | | 713/168 |
| 2015/0169076 | A1* | 6/2015 | Cohen | G06F 3/04815 |
| | | | | 345/156 |
| 2015/0268725 | A1* | 9/2015 | Levesque | G06F 3/016 |
| | | | | 345/156 |
| 2016/0088268 | A1* | 3/2016 | Durham | H04N 9/31 |
| | | | | 345/173 |
| 2016/0132111 | A1* | 5/2016 | Lowe | G06F 3/04886 |
| | | | | 345/156 |
| 2016/0253044 | A1* | 9/2016 | Katz | G06F 3/017 |
| | | | | 345/156 |
| 2017/0235376 | A1* | 8/2017 | Katz | G06F 3/017 |
| | | | | 345/158 |

FOREIGN PATENT DOCUMENTS

| | | |
|---|---|---|
| CN | 103336575 | 10/2013 |
| CN | 103336575 A | 10/2013 |
| CN | 103677561 A | 3/2014 |
| CN | 103713737 | 4/2014 |
| CN | 103713737 A | 4/2014 |
| CN | 103995592 | 8/2014 |
| CN | 105159539 A | 12/2015 |
| CN | 205050078 | 2/2016 |

OTHER PUBLICATIONS

"First Office Action," CN Application No. 201510575198.0 (dated Oct. 16, 2017).
Office Action received for Chinese Patent Application No. 201510575198.0, dated Jan. 10, 2018, 12 pages (7 pages of English Translation and 5 pages of Office Action).
Office Action received for Chinese Patent Application No. 201510575198.0, dated Dec. 5, 2017, 9 pages (4 pages of English Translation and 5 pages of Office Action).
International Preliminary Report on Patentability received for PCT Patent Application No. PCT/CN2016/073771, dated Mar. 22, 2018, 14 pages (9 pages of English Translation and 5 pages of Original Document).

* cited by examiner

METHOD AND APPARATUS FOR TOUCH RESPONDING OF WEARABLE DEVICE AS WELL AS WEARABLE DEVICE

RELATED APPLICATION

The present application is the U.S. national phase entry of PCT/CN2016/073771, with an international filing date of Feb. 14, 2016, which claims the benefit to Chinese Patent Application No. 201510575198.0, filed on Sep. 10, 2015, the entire disclosures of which are incorporated herein by reference.

FIELD

The present disclosure relates to the technical field of wearable devices, and particularly to a method and apparatus for touch responding of a wearable device, as well as the wearable device.

BACKGROUND

As science and technology develops, more and more wearable products enter people's life. Wearable products are usually manufactured relatively small to meet requirements of wearing comfort, and correspondingly, display screens configured for the wearable products are also relatively small. At present, since wearable products mainly employ a touch input manner, small screens may cause undesirable human-machine interaction experience to the users.

Taking a smart watch as an example, the smart watch is usually configured with a variety of software resources, and correspondingly, a dozen of or even tens of software icons may be displayed on a watch face screen. In practical usage, a finger may obscure relevant icons when the finger touches the screen, thereby causing that the user cannot determine a touch position accurately and hence may lead to inadvertent click at times. Although some smart watches may alleviate the above problems to a certain degree, by using some keys or defining some touch operation manners such as sliding upward, downward, leftward or rightward, a satisfactory effect has not been achieved yet.

To sum up, there are still technical problems in wearable devices that a user cannot learn feedback of effect of touch operations in real time and the control accuracy of wearable devices is still relatively low.

SUMMARY

An object of embodiments of the present disclosure is to provide a method and apparatus for touch responding of a wearable device, and a wearable device, to enable the wearable device to feed back effect of touch operations to a user in real time, thereby improving touch accuracy of the wearable device.

Embodiments of the present disclosure provide a method for touch responding of a wearable device, comprising: acquiring position information of a target fingertip collected by binocular recognition means in a set touch action occurrence area; determining a mapping point mapped on a screen of the wearable device for the target fingertip based on the position information of the target fingertip; and identifying the mapping point on the screen of the wearable device.

In solutions of embodiments of the present disclosure, when the target fingertip is located in the set touch action occurrence area, there are mapping relationships between positions of the target fingertip and a cursor displayed on the screen of the wearable device. As such, a user can hover touch the screen of the wearable device, and therefore the wearable device can feed back effect of touch operations to the user in real time. Hence, these solutions increase touch accuracy of the wearable device, improving the user experience.

Optionally, before acquiring the position information of the target fingertip in the set touch action occurrence area, the method further comprises setting the touch action occurrence area by: acquiring a target fingertip circling trajectory collected by the binocular recognition means after receiving a trigger instruction for setting the touch action occurrence area and determining a standard circling trajectory corresponding to the target fingertip circling trajectory; determining a reference point for establishing mapping between the target fingertip and the screen of the wearable device according to the standard circling trajectory and a boundary of the screen of the wearable device; and setting the touch action occurrence area according to the reference point, the standard circling trajectory and the boundary of the screen of the wearable device; wherein the mapping point is determined according to the position information of the target fingertip and the reference point.

More specifically, determining a standard circling trajectory corresponding to the target fingertip circling trajectory further comprises: performing envelop calculation for the target fingertip circling trajectory to determine a minimum envelop space that accommodates the target fingertip circling trajectory; and determining the standard circling trajectory corresponding to the target fingertip circling trajectory according to the minimum envelop space.

Optionally, the method further comprises: acquiring a gesture action of the target fingertip in the set touch action occurrence area; and performing a control operation matching with a set gesture action when the gesture action is identified as the set gesture action, and/or, enabling a cursor to display a preset variation effect matching with the set gesture action.

Optionally, the method further comprises: stopping the touch response upon detecting that the target fingertip located in the set touch action occurrence area moves out of the touch action occurrence area for a period exceeding a preset threshold.

Optionally, before determining a mapping point mapped on the screen of the wearable device for the target fingertip, the method further comprises: acquiring space acceleration information of the wearable device collected by an acceleration sensor; and modifying the position information of the target fingertip according to the space acceleration information.

After a user wears the wearable device, the position posture of the wearable device varies with the user's body action. An acceleration sensor is employed to detect the space acceleration information of the wearable device and modify the position information of the target fingertip according to the space acceleration information, which leads to more accurate calculation processing results and thus reduces misoperation and improves touch accuracy of the wearable device.

Embodiments of the present disclosure further provide an apparatus for touch responding of a wearable device, comprising: a first acquisition module configured to acquire position information of a target fingertip collected by binocular recognition means in a set touch action occurrence area; a determination module configured to determine a mapping point mapped on a screen of the wearable device for the target fingertip based on the position information of the target fingertip; and a processing module configured to identify the mapping point on the screen of the wearable device.

According to the apparatus for touch responding provided by the above embodiments of the present disclosure, when a target fingertip is located in a set touch action occurrence area, there are relationships between positions of the target fingertip and the cursor displayed on the screen of the wearable device. As such, the user can hover touch the screen of the wearable device and therefore the wearable device can feed back effect of touch operations to the user in real time. Hence, these solutions may increase the touch accuracy of the wearable device and therefore improve the user experience.

Embodiments of the present disclosure further provide a wearable device, comprising: binocular recognition means configured to collect position information of a target fingertip; and a controller communicatively connected with the binocular recognition means and configured to acquire position information of the target fingertip collected by the binocular recognition means in a set touch action occurrence area; determine a mapping point mapped on a screen of the wearable device for the target fingertip based on the position information of the target fingertip; and identify the mapping point on the screen of the wearable device Optionally, the wearable device further comprises an acceleration sensor communicatively connected with the controller.

Optionally, the acceleration sensor is a gyro or a three-axis acceleration sensor.

Optionally, the wearable device is a smart watch, which comprises a watch housing, and the controller is positioned inside the watch housing, and the binocular recognition means is positioned on an outer edge of the watch housing.

Optionally, the binocular recognition means comprises: a primary camera, a secondary camera, and a processing unit communicatively connected with the primary camera and the secondary camera respectively and configured to derive the position information of the target fingertip according to images captured by the primary camera and secondary camera.

The wearable device according to embodiments of the present disclosure has a hover touch function, and can feed back effect of touch operations to a user in real time. The touch accuracy is higher than the prior art and therefore the user experience may be enhanced substantially.

DETAILED DESCRIPTION

To enable the wearable device to feed back effect of touch operations to the user in real time and improve touch accuracy of the wearable device, embodiments of the present disclosure provide a method for touch responding and apparatus of a wearable device, and the wearable device. The present disclosure will be described in more detail through embodiments in conjunction with the drawings to illustrate objects, technical solutions and advantages of the present disclosure more apparent.

Figure 1:
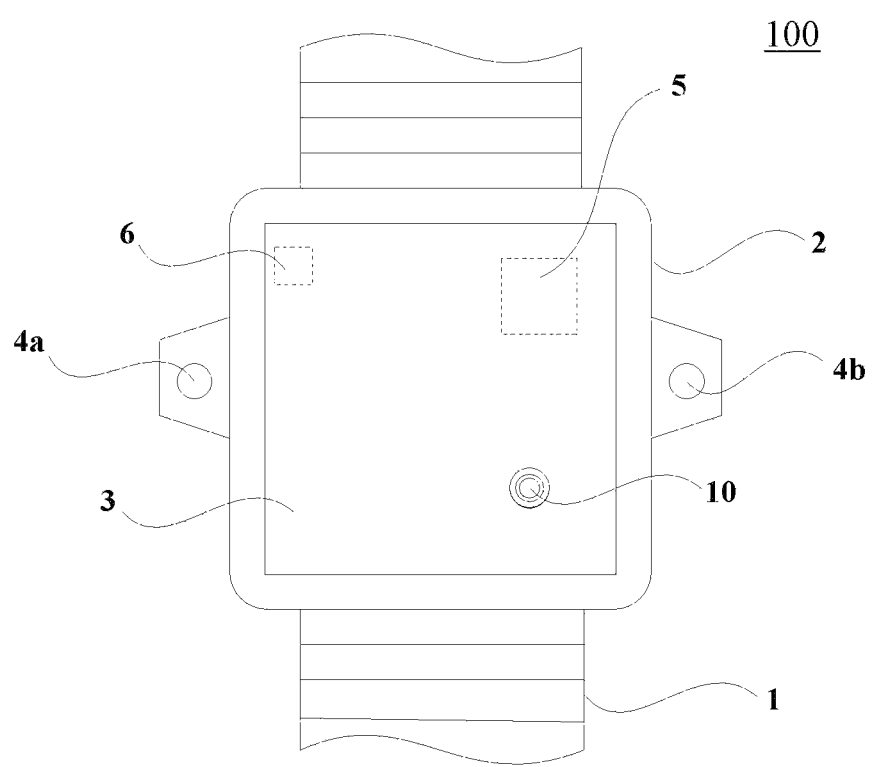
FIG. 1 is a structural schematic diagram of a wearable device according to an embodiment of the present disclosure.

FIG. 1 shows a wearable device 100 according to one or more embodiments of the present disclosure. As shown in FIG. 1, the wearable device 100 comprises: binocular recognition means, for example, binocular cameras 4a, 4b, which is configured to collect position information of a target fingertip; and a controller 5 communicatively connected with the binocular recognition means, which is configured to acquire position information of the target fingertip collected by the binocular recognition means in a set touch action occurrence area; determine a mapping point mapped on the screen of the wearable device for the target fingertip based on the position information of the target fingertip; and identify the mapping point on the screen of the wearable device. Optionally, the mapping point may be identified by displaying a cursor at a location of the mapping point or highlighting an effective area corresponding to the mapping point (e.g., an application icon or a certain selectable item corresponding to the mapping point).

In an example, a corresponding relationship between a position in the touch action occurrence area and a position on the screen of the wearable device may be preset.

In an embodiment of the present disclosure, the wearable device comprises (but not limited to) a smart watch, a smart bracelet and other smart accessories. As shown in FIG. 1, in this embodiment, the wearable device is specifically a smart watch comprising hardware entities such as a watch strap 1, a watch housing 2, a screen 3 and binocular cameras 4a, 4b. The binocular recognition means may comprise binocular cameras 4a, 4b and a processing unit communicatively connected with the binocular cameras. The processing unit of the binocular recognition means may be, together with a controller 5, positioned inside the watch housing 2. Optionally, the processing unit of the binocular recognition means, after being integrated with the controller 5, is positioned inside the watch housing 2.

The binocular cameras 4a, 4b comprise two cameras which are a primary camera and a secondary camera respectively. There may exist a certain position deviation in coordinate systems of the secondary camera and primary camera. The processing unit of the binocular recognition means may run a relevant recognition program in order to derive spatial position information of a target object (e.g., a target fingertip) according to images captured by the two cameras, for example, through precise calculation. Optionally, the processing unit of the binocular recognition means not only enables recognition of the user's hand, a hand gesture, and a position of a tip of a specific finger, but also enables concurrent recognition of fingertip positions of two or more fingers.

As shown in FIG. 1, in this embodiment, the watch housing 2 is rectangular, the controller 5 (preferably together with the processing unit of the binocular recognition means) is positioned inside the watch housing 2, and the primary camera and secondary camera are respectively positioned on edges of the watch housing 2, for example, on two opposed sides. In addition, the watch housing may take other shapes than rectangle, for example, circle, ellipse or the like.

In embodiments of the present disclosure, the target fingertip may be either any target fingertip or a specific target fingertip. For example, if a forefinger tip is defined as a target fingertip, the binocular recognition means may take the forefinger tip as a target object to be recognized, and the user may only use the forefinger tip to perform an hover touch operation in a space area; if an arbitrary fingertip is defined as the target fingertip, the binocular recognition means take any arbitrary fingertip as the target object to be recognized, and the user may use any arbitrary fingertip to perform a hover touch operation.

When the target fingertip is located a set touch action occurrence area, there is a mapping point on the screen of the wearable device that corresponds to the position of the target fingertip. It is desirable to display a cursor at the location of the mapping point to identify or feed back to the user relative position information of the target fingertip on the screen of the wearable device. The cursor is in a shape of (but is not limited to) a mouse, a small red point, a small circle and the like. When the user moves the target fingertip in the set touch action occurrence area, the position of the mapping point on the screen changes accordingly, and then the user may see corresponding movement of the cursor on the screen. When the target fingertip moves out of the set touch action occurrence area, the cursor disappears from the screen, and then the user may determine that the target fingertip has already moved out of the touchable area.

In technical solutions of embodiments of the present disclosure, when a target fingertip is located in a set touch action occurrence area, there are mapping relationships between positions of the target fingertip and a cursor displayed on the screen of the wearable device. The user may control movement of the cursor by moving the target fingertip and then perform hover touch operations on the screen of the wearable device, so that the wearable device can feed back effects of touch operations to the user in real time. Hence, these solutions increase the touch accuracy of the wearable device and improve the user experience.

According to embodiments of the present disclosure, the set touch action occurrence area may be a certain fixed and invariable area. Alternatively or additionally, the set touch action occurrence area could be a certain area that a user sets when a hover touch function of the wearable device is enabled. According to an example, when setting the touch action occurrence area, a controller may, acquire the target fingertip circling trajectory collected by the binocular recognition means after receiving a trigger instruction for setting the touch action occurrence area; determine a standard circling trajectory corresponding to the target fingertip circling trajectory; determine a reference point for establishing mapping between the target fingertip and the screen of the wearable device based on the standard circling trajectory and a boundary of the screen of the wearable device; and set the touch action occurrence area according to the reference point, the standard circling trajectory and the boundary of the screen of the wearable device. The controller may determine the mapping point based on the position information of the target fingertip and the reference point For example, the mapping point may be determined as an intersection of a connection line between the reference point and the target fingertip with the screen of the wearable device.

Optionally, pressing on a certain physical key, single-clicking or double-clicking on the screen by a user may be set as a trigger condition for setting the touch action occurrence area (and optionally enabling the hover touch function). After the user performs a trigger operation, the touch action occurrence area may be set. As compared with a solution in which a fixed and invariable touch action occurrence area is set, the user may set or update the touch action occurrence area in any posture at any time, without adjusting his/her own posture. This facilitates a subsequent hover touch operation and the accuracy thereof is high.

As shown in FIG. 1, in an embodiment, the wearable device further comprises an acceleration sensor 6 communicatively connected with the controller 5. The acceleration sensor 6 may be used to collect space acceleration information of the wearable device; and the controller 5 may modify position information of the target fingertip according to the space acceleration information of the wearable device.

The acceleration sensor is an electronic device capable of measuring an accelerating force, which may be applied in the wearable device, and may detect the space acceleration information of the wearable device. Detection of the space acceleration information corresponds to sensing of a posture position change of the wearable device. The acceleration sensor includes (but not limited to) a gyro, a three-axis acceleration sensor or the like. The controller 5, before using position information of the target fingertip, may modify it according to the space acceleration information of the wearable device, thereby reducing a deviation of position information of the target fingertip caused by instability of the user's posture and hence decreasing occurrence of wrong touch actions.

Optionally, the controller 5 may further perform a control operation matching with a specific gesture action, and/or enable the cursor to display a specific variation effect when the target fingertip is located in the set touch action occurrence area and performs the specific gesture action. For example, when the cursor is located on an icon button of a certain application on the screen of the wearable device, and the target fingertip makes a clicking action, e.g. an action that first approaches and then departs away from the screen, within a preset time period (e.g., within one second), the application may be launched. Meanwhile, the cursor is enabled to present a specific variation effect, for example, changing the shape of the mouse, presenting firework setting-off effect, or presenting water wave effect or the like, thereby prompting the user that the application is being launched. Types of specific gesture actions may be set in conjunction with ergonomics or user habits.

In an embodiment of the present disclosure, the controller 5 may, cancel cursor display on the screen of the wearable device if the position information of the target fingertip is not acquired, and/or, eliminate setting records of the touch action occurrence area after a preset time period expires.

In an example, when the target fingertip moves out of the set touch action occurrence area, the cursor on the screen of the wearable device is cancelled accordingly, thereby enabling the user to obtain an operation feedback. In addition, if the target fingertip moves out of the set touch action occurrence area for a period exceeding a preset time period (e.g., five minutes), the setting record of the touch action occurrence area is eliminated. If a user would like to use the hover touch function of the wearable device, the user may be required to perform the triggering operation again and reset the touch action occurrence area. Optionally, the binocular recognition means may work only after the user enables the hover touch function of the wearable device. One of advantages of the solution is that the binocular recognition means may be in a standby or off state when the user does not enable the hover touch function, which may not only save system resources but also reduce wrong recognition of touch actions.

It may be appreciated that the controller of the wearable device in embodiments of the present disclosure may be implemented by a control chip, and it may also be implemented by a processor, a microprocessor, a circuit, a circuit unit, an integrated circuit, an application-specific integrated circuit (ASIC), a programmable logic device (PLD), a digital signal processor (DSP) or the like.

Optionally, in addition to the binocular recognition means, the controller may acquire position information of a target fingertip from any other suitable types of object recognition means, including but not limited to 3-dimensional object recognition means employing 3-dimenstional detection technology such as time-of-flight (ToF) technology, structured light technology or millimeter wave radar technology.

Figure 2:
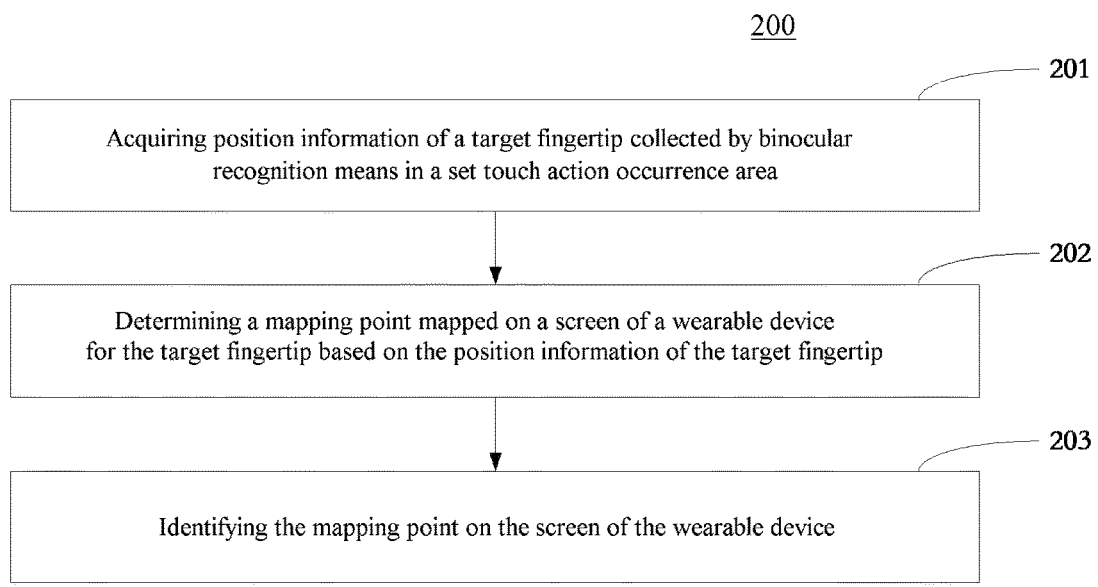
FIG. 2 is a flow chart of a method for touch responding of a wearable device according to an embodiment of the present disclosure.

FIG. 2 is a flow chart illustrating a touch response method 200 of a wearable device according to embodiments of the present disclosure. The touch response method 200 comprises the following steps:

Step 201: acquiring position information of a target fingertip collected by binocular recognition means in a set touch action occurrence area;

Step 202: determining a mapping point mapped on the screen of the wearable device for the target fingertip based on the position information of the target fingertip; and Step 203: identify the mapping point on the screen of the wearable device.

According to the touch response method of embodiments of the present disclosure, when the target fingertip is located in the set touch action occurrence area, there are mapping relationships between positions of the target fingertip and a cursor displayed on the screen of the wearable device. This enables a user to perform hover touch operations on the screen of the wearable device so that the wearable device can feed back effects of touch operations to the user in real time. Hence, these solutions increase the touch accuracy of the wearable device and improve the user experience.

The set touch action occurrence area may be a fixed and invariable area, or it may be a certain area set when the user enables a hover touch function of the wearable device.

In an embodiment of the present disclosure, before step 201, the touch response method further comprises: setting the touch action occurrence area.

Figure 3:
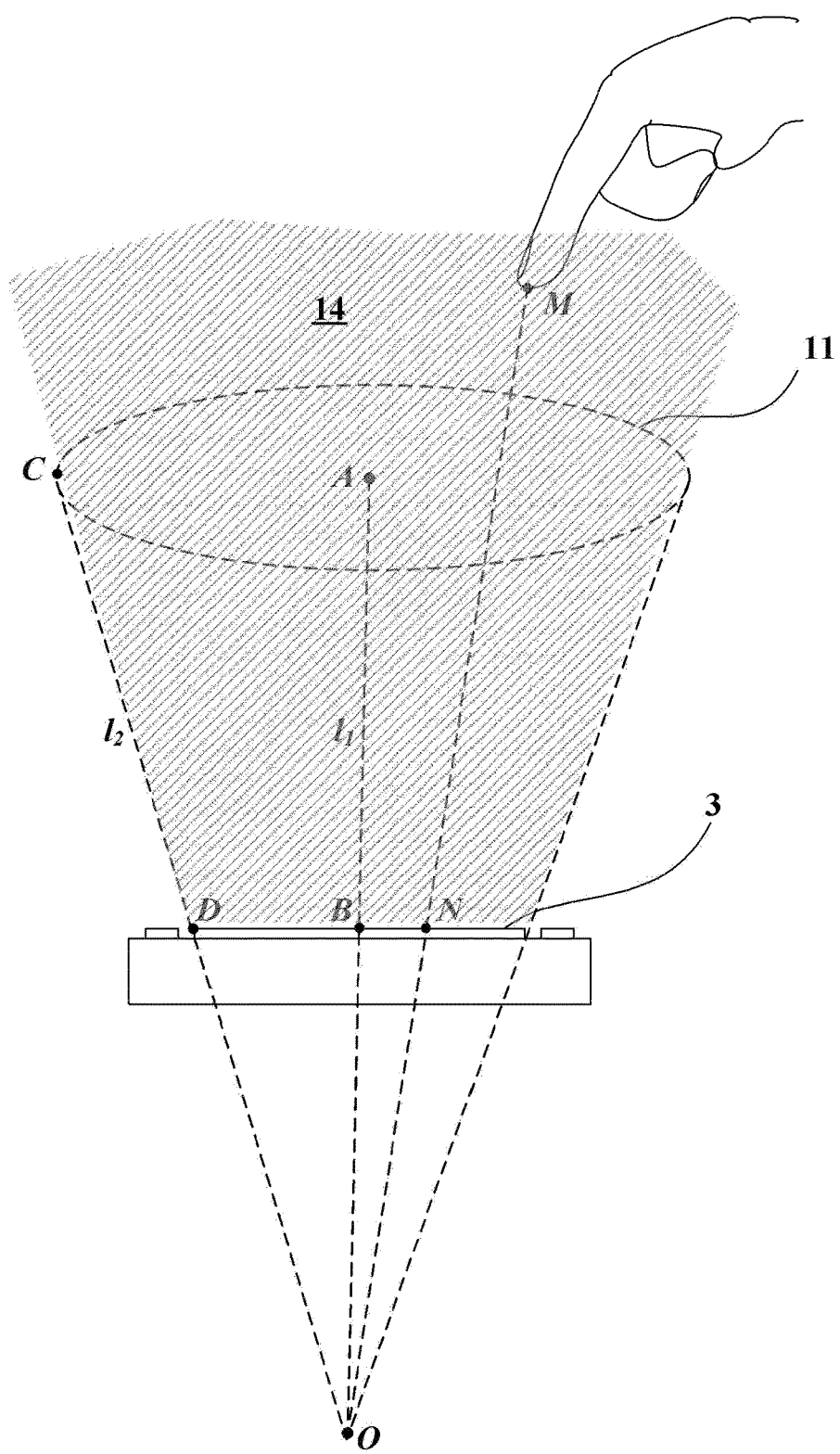
FIG. 3 is a schematic diagram illustrating mapping of a target fingertip to a screen of the wearable device.
Figure 4:
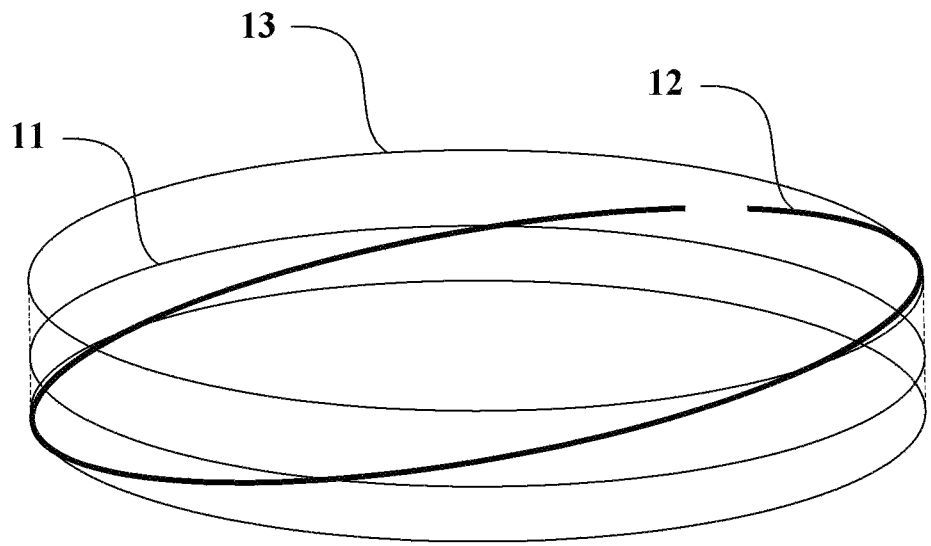
FIG. 4 is a schematic diagram illustrating determination of a standard circling trajectory.

As shown in FIG. 3 and FIG. 4, in an alternative embodiment of the method of the present disclosure, the touch action occurrence area may be set as follows:

Step 1: acquiring a target fingertip circling trajectory 12 (as shown in FIG. 4) collected by the binocular recognition means after receiving a trigger instruction for setting the touch action occurrence area. The target fingertip circling trajectory may be substantially circular, square or other shapes. Since the circling is virtually drawn by the user in the air, the target fingertip circling trajectory is not necessarily an ideal shape, a closed trajectory, or a planar graph.

Step 2: determining a standard circling trajectory 11 corresponding to the target fingertip circling trajectory 12. The standard circling trajectory 11 is a boundary of the set touch action occurrence area. The standard circling trajectory 11 may be determined by the following sub-steps:

Sub-step 1: performing envelop calculation for the target fingertip circling trajectory 12, and determining a minimum envelop space 13 that accommodates the target fingertip circling trajectory 12. The shape of the minimum envelop space includes (but not limited to) a cylindrical space, a cuboid space or the like. In an example, a shape of the cross section of the minimum envelop space is adapted to the shape of the screen of the wearable device. In an embodiment shown in FIG. 4, the minimum envelop space 13 is a minimum cylindrical space of a minimum diameter and a minimum height that can accommodate the target fingertip circling trajectory 12.

Sub-step 2: determining a standard circling trajectory 11 corresponding to the target fingertip circling trajectory 12 according to the minimum envelop space 13. As shown in FIG. 4, circumference of a circular plane where a cylindrical center of the cylindrical space is contained may be defined as the standard circling trajectory, or circumference of a circular surface of the cylindrical space may be define as the standard circling trajectory. If the minimum envelop space is a cuboid or other shape, the standard circling trajectory may be defined using similar rules. In an example, the shape and size of the standard circling trajectory depend on those of the screen of the wearable device. For example, an area of the region surrounded by the standard circling trajectory may be proportional to the area of the screen of the wearable device. In this step, the shape and size of the standard circling trajectory 11, as well as its position relative to the screen, may all be determined by geometrical calculations.

Step 3: determining a reference point for establishing mapping between the target fingertip and the screen of the wearable device according to the standard circling trajectory and the boundary of the screen of the wearable device. As shown in FIG. 3, in the embodiment, the reference point may be determined by: forming a straight line $l_1$ by connecting a central point A of the standard circling trajectory and a central point B of the screen; determining an intersection C of an arbitrary plane containing the straight line $l_1$ with the standard circling trajectory, and a respective intersection D with the boundary of the screen; forming a straight line $l_2$ by connecting the intersection C and interaction D, an intersection O of straight lines $l_1$ and $l_2$ being the reference point. In this embodiment, the mapping point may be determined as an intersection of the connection line between the reference point and the target fingertip with the screen of the wearable device. The mapping point is illustrated as an intersection N of a connection line between the target fingertip M and point O with the screen 3 in FIG. 3.

It may be appreciated that the reference point may be determined using a geometrical calculation method adapted for determining a mapping relationship between two space planes (herein a region surrounded by the standard circling trajectory and a region of the screen of the wearable device). For example, when the region surrounded by the standard circling trajectory and the region of the screen of the wearable device have same shape and areas of these regions are in direct proportion with each other, the reference point may be determined based on a distance between the region surrounded by the standard circling trajectory and the screen of the wearable device and the area proportional relationship thereof.

Step 4: setting the touch action occurrence area 14 based on the reference point O, the standard circling trajectory 11 and the boundary of the screen 3. In the set touch action occurrence area, no matter which position the target fingerprint is located, it can be mapped to a corresponding mapping point on the screen of the wearable device. It should be appreciated that the touch action occurrence area 14 in FIG. 3 is only for illustrative, and the touch action occurrence area may be a set of target fingertip positions that enable to form mapping relationships between the target fingertip and the points on the screen of the wearable device.

Pressing on a certain physical key, single-clicking on the screen or double-clicking on the screen by a user may be set as a trigger condition for setting a touch action occurrence area and optionally enabling a hover touch function. After the user performs the trigger operation, the touch action occurrence area may be set according to the above steps. By employing the above solutions, the user may set or update the touch action occurrence area in any posture at any time, thereby facilitating subsequent hover touch operations and increasing accuracy.

In alternative embodiments of the present disclosure, the method for touch responding further comprises: acquiring a gesture action of the target fingertip in the set touch action occurrence area; performing a control operation matching with a set gesture action when the gesture action is identified as the set gesture action, and/or, enabling a cursor to present a preset variation effect matching with the set gesture action.

In alternative embodiments of the present disclosure, the method for touch responding further comprises: stopping the touch response upon detecting that the target fingertip located in the set touch action occurrence area moves out of the touch action occurrence area for a period exceeding a preset threshold. Stopping the touch response may comprise cancelling cursor display on the screen of the wearable device, and eliminating setting records for the touch action occurrence area and/or disabling using the hover touch function.

In alternative embodiments of the present disclosure, before determining the mapping point mapped on the screen of the wearable device for the target fingertip, the method for touch responding further comprises: acquiring space acceleration information of the wearable device collected by an acceleration sensor; and modifying position information of the target fingertip according to the space acceleration information of the wearable device.

After the user wears the wearable device, the position posture of the wearable device varies with the user's body action. By using the acceleration sensor to detect space acceleration information of the wearable device and modify position information of the target fingertip according to the space acceleration information, positions of mapping points may be determined more accurately, thereby reducing misoperation and improving touch accuracy of the wearable device.

In the above embodiments, a target fingertip is an arbitrary target fingertip, or the target fingertip is a specific target fingertip.

Figure 5:
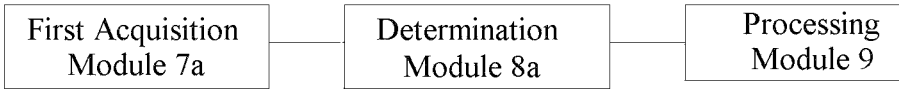
FIG. 5 is a structural schematic diagram of an apparatus for touch responding of a wearable device according to an embodiment of the present disclosure.

FIG. 5 illustrates a touch response apparatus 500 of a wearable device according to embodiments of the present disclosure. The touch response apparatus 500 comprises:

a first acquisition module 7a configured to acquire position information of a target fingertip collected by binocular recognition means in a set touch action occurrence area;

a determination module 8a configured to determine a mapping point mapped on the screen of the wearable device for the target fingertip based on the position information of the target fingertip; and a processing module 9 configured to identify the mapping point on the screen of the wearable device.

According to the touch response apparatus of the wearable device in embodiments of the present disclosure, when a target fingertip is located in a set touch action occurrence area, there may exist mapping relationships between positions of the target fingertip and a cursor displayed on the screen of the wearable device. As such, a user can hover touch the screen of the wearable device so that the wearable device can feed back effects of touch operations to the user in real time. Hence, these solutions increase touch accuracy of the wearable device and improve the user experience.

Figure 6:
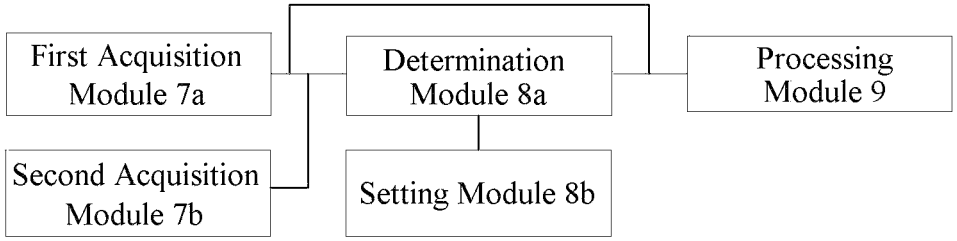
FIG. 6 is a structural schematic diagram of an apparatus for touch responding of a wearable device according to another embodiment of the present disclosure.

FIG. 6 illustrates a touch response apparatus 600 of a wearable device according to embodiments of the present disclosure. In addition to the first acquisition module 7a, the determination module 8a and the processing module 9 identical with those as shown in FIG. 5, the touch response apparatus 600 further comprises a setting module 8b configured to set the touch action occurrence area before acquiring the position information of the target fingertip in the set touch action occurrence area. Setting the touch action occurrence area comprises: acquiring a target fingertip circling trajectory collected by the binocular recognition means after receiving a trigger instruction for setting the touch action occurrence area and determining a standard circling trajectory corresponding to the target fingertip circling trajectory; determining a reference point for establishing mapping between the target fingertip and the screen of the wearable device according to the standard circling trajectory and a boundary of the screen of the wearable device; setting the touch action occurrence area according to the reference point, the standard circling trajectory and the boundary of the screen of the wearable device. The mapping point is determined according to the reference point and the position information of the target fingertip.

In an alternative embodiment, the setting module 8b is further configured to perform envelop calculation for the target fingertip circling trajectory, and determine a minimum envelop space that can accommodate the target fingertip circling trajectory; and determine the standard circling trajectory corresponding to the target fingertip circling trajectory according to the minimum envelop space.

In an alternative embodiment, the first acquisition module 7a is further configured to acquire a gesture action of the target fingertip in the set touch action occurrence area; the processing module 9 is further configured to perform a control operation matching with a set gesture action when the gesture action is identified as the set gesture action, and/or, enable the cursor to display a preset variation effect matching with the set gesture action.

In an alternative embodiment, the processing module 9 is further configured to stop the touch response upon detecting that the target fingertip located in the set touch action occurrence area moves out of the touch action occurrence area for a period exceeding a preset threshold.

In an alternative embodiment, the touch response apparatus 600 further comprises a second acquisition module 7b. The second acquisition module 7b is configured to acquire space acceleration information of the wearable device collected by an acceleration sensor; and the determination module 8a is configured to modify the position information of the target fingertip, according to the space acceleration information of the wearable device.

According to embodiments of the present disclosure, the first acquisition module, the determination module, the processing module, the second acquisition module, and the setting module may be implemented by using a hardware unit, a software unit or a combination thereof. According to embodiments of the present disclosure, these modules may be implemented by providing a computer program instruction to a processor of a general purpose computer, a dedicated computer, or other programmable data processing devices so that the computer program instructions are executed via the processor of the computer to implement functions/actions corresponding to respective modules.

Optionally, the target fingertip is an arbitrary target fingertip, or the target fingertip is a specific target fingertip.

Embodiments of the present disclosure further provide a wearable device, comprising: binocular recognition means positioned on the wearable device (e.g., its main body structure) and configured to collect position information of the target fingertip; and a controller communicatively connected with the binocular recognition means and configured to receive position information of the target fingertip collected by the binocular recognition means, and take a region on the screen of the wearable device corresponding to the position information as the touch area.

Optionally, the wearable device is a smart watch, and the main body structure comprises a watch housing and a screen.

Optionally, the binocular recognition means comprises: a primary camera, a secondary camera, and a processing unit communicatively connected with the primary camera and the secondary camera respectively.

Optionally, the screen of the wearable device is rectangular, and the primary camera and secondary camera are respectively positioned on two opposed sides of the screen.

Optionally, the watch housing and the screen are circular, the primary camera and secondary camera are respectively positioned on edges of the watch housing or screen, and located on a radial line of the circular watch housing or screen.

The wearable device according to embodiments of the present disclosure allows improving accuracy of touch area of the wearable device.

It is apparent that those skilled in the art may make various modification and variations to the present disclosure without departing from the spirit and scope of the present disclosure. As such, if these modifications and variations of the present disclosure fall within the scope of claims and equivalent technologies thereof, the present disclosure is intended to include these modifications and variations.

REFERENCE NUMBERS

1—watch strap
2—watch housing
3—screen
4a, 4b—binocular camera
5—controller
6—acceleration sensor
7a—first acquisition module
7b—second acquisition module
8a—determination module
8b—setting module
9—processing module
10—cursor
11—standard circling trajectory
12—target fingertip circling trajectory
13—minimum envelop space
14—set touch action occurrence area

What is claimed is:

1. A method for touch responding of a wearable device, comprising:
   acquiring position information of a target fingertip collected by binocular recognition means in a set touch action occurrence area;
   determining a mapping point mapped on the screen of the wearable device for the target fingertip based on the position information of the target fingertip and the corresponding relationship; and
   identifying the mapping point on the screen of the wearable device;
   wherein before said acquiring the position information of the target fingertip in the set touch action occurrence area, the method further comprises setting the touch action occurrence area by:
   acquiring a target fingertip circling trajectory collected by the binocular recognition means after receiving a trigger instruction for setting the touch action occurrence area and determining a standard circling trajectory corresponding to the target fingertip circling trajectory;
   determining a reference point for establishing mapping between the target fingertip and the screen of the wearable device according to the standard circling trajectory and a boundary of the screen of the wearable device; and
   setting the touch action occurrence area according to the reference point, the standard circling trajectory and the boundary of the screen of the wearable device;
   wherein the mapping point is determined according to the position information of the target fingertip and the reference point.

2. The method according to claim 1, wherein determining a standard circling trajectory corresponding to the target fingertip circling trajectory comprises:
   performing envelop calculation for the target fingertip circling trajectory to determine a minimum envelop space that accommodates the target fingertip circling trajectory; and
   determining the standard circling trajectory corresponding to the target fingertip circling trajectory according to the minimum envelop space.

3. The method according to claim 2, wherein the method further comprises:
   acquiring a gesture action of the target fingertip in the set touch action occurrence area; and
   performing a control operation matching with a set gesture action when the gesture action is identified as the set gesture action, and/or, enabling a cursor to display a preset variation effect matching with the set gesture action.

4. The method according to claim 1, wherein the method further comprises:
   acquiring a gesture action of the target fingertip in the set touch action occurrence area; and
   performing a control operation matching with a set gesture action when the gesture action is identified as the set gesture action, and/or, enabling a cursor to display a preset variation effect matching with the set gesture action.

5. The method according to claim 4, wherein the method further comprises:
   stopping the touch response upon detecting that the target fingertip located in the set touch action occurrence area moves out of the touch action occurrence area for a period exceeding a preset threshold.

6. The method according to claim 1, wherein before determining a mapping point mapped on the screen of the wearable device for the target fingertip, the method further comprises:
   acquiring space acceleration information of the wearable device collected by an acceleration sensor; and
   modifying the position information of the target fingertip according to the space acceleration information.

7. An apparatus for touch responding of a wearable device, comprising:
   a first acquisition module configured to acquire position information of a target fingertip collected by binocular recognition means in a set touch action occurrence area;
   a determination module configured to determine a mapping point mapped on the screen of the wearable device for the target fingertip based on the position information of the target fingertip and the corresponding relationship;
a processing module configured to identify the mapping point on the screen of the wearable device; and
a setting module configured to set the touch action occurrence area before acquiring the position information of the target fingertip in the set touch action occurrence area by:
acquiring the target fingertip circling trajectory collected by binocular recognition means after receiving a trigger instruction for setting the touch action occurrence area and determining a standard circling trajectory corresponding to the target fingertip circling trajectory;
determining a reference point for establishing mapping between the target fingertip and the screen of the wearable device according to the standard circling trajectory and a boundary of the screen of the wearable device; and setting the touch action occurrence area according to the reference point, the standard circling trajectory and the boundary of the screen of the wearable device; and
the setting module is further configured to determine the mapping point according to the position information of the target fingertip and the reference point.

8. The apparatus according to claim 7, wherein the setting module is further configured to perform envelop calculation for the target fingertip circling trajectory, and determine a minimum envelop space that accommodates the target fingertip circling trajectory; and determine the standard circling trajectory corresponding to the target fingertip circling trajectory according to the minimum envelop space.

9. The apparatus according to claim 8, wherein
the first acquisition module is further configured to acquire a gesture action of the target fingertip in the set touch action occurrence area; and
the processing module is further configured to perform a control operation matching with a set gesture action when the gesture action is identified as the set gesture action, and/or, enable a cursor to display a preset variation effect matching with the set gesture action.

10. The apparatus according to claim 7, wherein
the first acquisition module is further configured to acquire a gesture action of the target fingertip in the set touch action occurrence area; and
the processing module is further configured to perform a control operation matching with a set gesture action when the gesture action is identified as the set gesture action, and/or, enable a cursor to display a preset variation effect matching with the set gesture action.

11. The apparatus according to claim 10, wherein the processing module is further configured to stop the touch response upon detecting that the target fingertip located in the set touch action occurrence area moves out of the touch action occurrence area for a period exceeding a preset threshold.

12. The apparatus according to claim 7, further comprising a second acquisition module configured to acquire space acceleration information of the wearable device collected by an acceleration sensor; and the determination module is further configured to modify the position information of the target fingertip according to the space acceleration information of the wearable device.

13. A wearable device, comprising:
binocular recognition means configured to collect position information of a target fingertip; and
a controller communicatively connected with the binocular recognition means and configured to acquire position information of the target fingertip collected by the binocular recognition means in a set touch action occurrence area; determine a mapping point mapped on the screen of the wearable device for the target fingertip based on the position information of the target fingertip and the corresponding relationship; and identify the mapping point on the screen of the wearable device;
said controller being further configured to set the touch action occurrence area before acquiring the position information of the target fingertip in the set touch action occurrence area by:
acquiring the target fingertip circling trajectory collected by binocular recognition means after receiving a trigger instruction for setting the touch action occurrence area and determining a standard circling trajectory corresponding to the target fingertip circling trajectory;
determining a reference point for establishing mapping between the target fingertip and the screen of the wearable device according to the standard circling trajectory and a boundary of the screen of the wearable device; and setting the touch action occurrence area according to the reference point, the standard circling trajectory and the boundary of the screen of the wearable device; and
said controller being further configured to determine the mapping point according to the position information of the target fingertip and the reference point.

14. The wearable device according to claim 13, wherein the wearable device further comprises an acceleration sensor communicatively connected with the controller.

15. The wearable device according to claim 14, wherein the acceleration sensor is a gyro or a three-axis acceleration sensor.

16. The wearable device according to claim 13, wherein the wearable device is a smart watch that comprises a watch housing, the controller is positioned inside the watch housing, and the binocular recognition means is positioned on an outer edge of the watch housing.

17. The wearable device according to claim 16, wherein the binocular recognition means comprises a primary camera, a secondary camera, and a processing unit communicatively connected with the primary camera and the secondary camera respectively and configured to derive the position information of the target fingertip according to images captured by the primary camera and secondary camera.

* * * * *